United States Patent [19]

Kool et al.

[11] Patent Number: 4,845,181

[45] Date of Patent: Jul. 4, 1989

[54] ORGANIC CONDENSATION POLYMERS AND METHOD OF MAKING SAME

[75] Inventors: Lawrence B. Kool, Cambridge; George M. Whitesides, Newton, both of Mass.

[73] Assignee: President and Fellows of Harvard College, Cambridge, Mass.

[21] Appl. No.: 249,592

[22] Filed: Sep. 26, 1988

Related U.S. Application Data

[63] Continuation-in-part of Ser. No. 114,656, Oct. 28, 1987, abandoned.

[51] Int. Cl.[4] .............................................. C08G 18/04
[52] U.S. Cl. ....................................... 528/48; 528/51; 528/57; 528/71; 528/75; 528/354; 528/355; 528/358; 528/367; 528/368; 528/370; 528/371; 528/372; 528/392
[58] Field of Search ...................... 528/48, 51, 57, 71, 528/75, 354, 355, 358, 367, 368, 370, 371, 372, 392

[56] References Cited

U.S. PATENT DOCUMENTS 2,964,482  12/1960  Leary et al. ............................ 260/22
4,483,961  11/1984  Koch et al. ........................... 524/542

OTHER PUBLICATIONS

Fujisawa et al., Tetrahedron Letters No. 37, pp. 3331–3334, (1976).

*Primary Examiner*—Maurice J. Welsh

[57] ABSTRACT

An organic condensation polymer made by reacting in solution of first compound having at least two anionic carbon sites bonded to each other either directly or through a chain of 1 to 30 carbon atoms, including a bisacetylide or a first compound having an anionic carbon site and a latent anionic carbon site bonded to each other either directly or through a chain of 1 to 30 carbon atoms, such as organometallic cyclopentadienides, with a second compound containing at least two electrophillic carbon sites bonded to each other either directly or through a chain of 1 to 30 carbon atoms, including diesters, dihalides, diamides or dianhydrides of polycarboxylic acids, and diisocyanates.

28 Claims, 1 Drawing Sheet

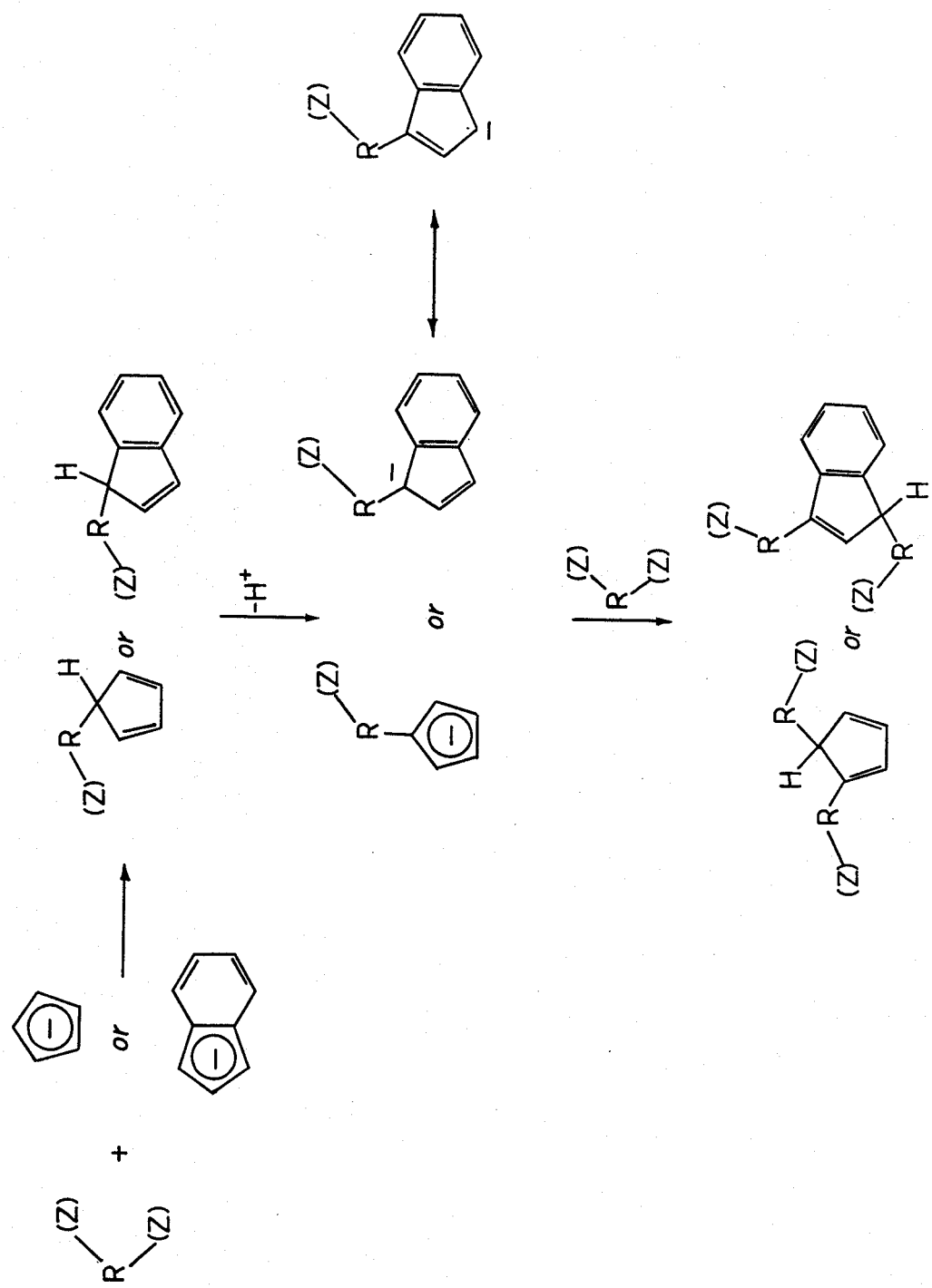

ORGANIC CONDENSATION POLYMERS AND METHOD OF MAKING SAME

This application is a continuation-in-part of U.S. Ser. No. 114,656 filed Oct. 28, 1987 and now abandoned.

This invention was made with Government support and the U.S. Government has certain rights in the invention.

The invention is concerned with organic polymers which can be formed in reactions of carbon dinucleophiles with difunctional derivatives of carboxylic acids or with diisocyanates, and with the method of making them. Such polymers are characterized as organic condensation polymers in which the bonds connecting the monomeric units are carbon-carbon bonds. More particularly the invention relates to polymers made by reacting in solution a first compound which is either (a) one having at least two anionic carbon sites bonded to each other either directly or through a chain of 1 to 30 carbon atoms or (b) one having an anionic carbon site and a latent anionic carbon site bonded to each other either directly or through a chain of 1 to 30 carbon atoms, with a second compound providing at least two electrophilic carbon sites bonded to each other either directly or through a chain of 1 to 30 carbon atoms. The invention is also concerned with the method of making such polymers by reacting in solution, preferably at a temperature from $-78°$ to $200°$ C., a first compound as defined above with a second compound as defined above. By the term "latent anionic carbon site" is meant one which is not present in the starting material used as the first compound but which can be generated by deprotonation after reaction of the first anionic carbon site (which is actually present in the starting material) with an electrophilic carbon site of the second compound. Usually the deprotonation is brought about by including in the reaction mixture a deprotonating agent such as a base in an amount equivalent to or greater than the compound to regenerate a nucleophilic site after the first stage reaction with the single initially available nucleophilic site. The base can be an alkali metal or alkaline earth metal hydroxide, but an organic base such as triethylamine or other alkyl amine which is readily soluble in the organic solvent is generally preferred. The base may be present initially, during the first stage reaction, or it may be added after the first stage reaction is complete.

It has previously been proposed to react compounds such as diamines or diols with various difunctional carboxylic acids and difunctional derivatives of such acids to form polymers such as polyamides, polyesters, polyurethanes and the like. It has also been proposed to form alkyd resins and other polymers from cyclodienes as described in Leary et al., U.S. Pat. No. 2,964,482 and Koch et al., U.S. Pat. No. 4,483,961; and acetylation of cyclopentadiene has been described in Fujisawa et al., Tetrahedron Letters No. 37, 3331-3334 (1976).

The present invention, by reacting compounds having two or more anionic carbon sites or those having one anionic carbon site and one latent anionic carbon site with compounds providing at least two electrophilic carbon sites, yields novel condensation polymers which may have a backbone chain consisting of carbon atoms and which may have a variety of functional groups attached to the backbone chain and in which the monomeric units are bonded together solely through carbon to carbon bonds. The backbone chain may include aromatic as well as aliphatic carbon atoms and may include both single and double bonds. Most of the polymers are soluble in industrial solvents commonly available. Those polymers containing carboxyl groups are soluble in aqueous and aqueous alkaline solvents. They can be cast into films or drawn into fibers from solution and can in many cases be converted into tough insoluble solids exhibiting good thermal stability and tensile strength simply by heating in air or under an inert gas at temperatures as high as $300°$ C. or even higher. They are useful inter alia as components of composite products and as high temperature dielectric materials and as general purpose synthetic resins. Certain of these are also useful as ion exchange resins, viscosifiers, and for other uses.

The first compound of type (a) used in making the polymers of the present invention, the compound having at least two anionic carbon sites, includes organometallic compounds such as those which comprise at least two acetylenyl groups bonded to each other directly or through a chain of 1 to 30 carbon atoms, and each acetylenyl group is ionically associated with a metal of Group I, II or III of the Periodic Table or with a non-metallic cation such as ammonium or phosphonium; preferred are those compounds in which each acetylenyl group is ionically associated with an alkali metal, an alkaline earth metal, ammonium, or phosphonium. These include bis-acetylide compounds with alkali metals etc. such as dilithium acetylide, 1,3-diethynyl benzene dilithium, 1,4-diethynyl benzene dilithium, 4,4'-diethynyl biphenyl disodium, 2,6-diethynyl naphthalene dilithium, dilithium diethynyl alkanes having 1 to 30 carbon atoms in the chain between the ethynyl groups, such as 1,9-decadiyne dilithium, and the like. The first compound of type (b) used in making polymers of the present invention, the compound having an anionic carbon site and a latent anionic carbon site, includes organometallic compounds such as those containing a non-aromatic unsaturated hydrocarbon ring ionically associated with a metal of Group I, II or III of the Periodic Table or with a non-metallic cation such as ammonium or phosphonium; preferred organometallic compounds are those in which a non-aromatic unsaturated hydrocarbon ring is ionically associated with an alkali metal, such as sodium, potassium, lithium or cesium, an alkaline earth metal such as calcium, barium, strontium or magnesium, or ammonium or phosphonium. Among such compounds are cyclopentadienyl sodium and indenyl sodium, and corresponding compounds in which sodium is replaced by another alkali metal such as potassium, lithium, etc. or by an alkaline earth metal such as calcium, magnesium, etc. or by ammonium or phosphonium ions.

The second component used in making the polymers, the compound providing at least two electrophilic carbon sites, preferably includes compounds in which a carbonyl group or an isocyanate group forms each electrophilic site. A preferred class of compounds comprises at least two carbonyl groups or isocyanate groups bonded to each other either directly or through a chain of 1 to 30 carbon atoms. Among compounds which can be used are carbonic acid diesters or dihalides such as dimethyl carbonate, carbonyl dichloride (phosgene), and the dihalides, diamides, diesters, or dianhydrides of polycarboxylic acids such as adipoyl chloride, diethyl isophthalate, terephthalyl chloride, 1,6-naphthalene dicarboxylic anhydride, pyromellitic dianhydride, 3,3', 4,4'-benzophenone tetracarboxylic dianhydride, and diisocyanates such as toluene diisocyanate, hexamethylene 1,6-diisocyanate, and the like.

In carrying out the polymerization, the first and second compounds are dissolved in approximately equivalent amounts in a suitable solvent inert to the reagents, such as dioxane or tetrahydrofuran. Although an excess of either compound may be present, only equivalent amounts react so that any excess is to be avoided in order to obtain a polymer product of maximum purity, high molecular weight and requiring minimum purification steps. Lower molecular weight polymer, and polymer containing residual functionality and suitable for further modification, can be obtained by using unequal quantities of reactants.

In general, the reaction proceeds at any temperature from −78° to 200° C. or even higher, but a temperature range of 0° to 50° C. is usually preferred.

In the case where the first compound includes a cyclopentadiene or indene moiety and therefore contains a latent anionic carbon site, the reaction occurs in two stages, and a deprotonating agent such as a base must be present.

In the drawing,

The FIGURE is a schematic representation of a two-stage reaction in accordance with the invention, in which (Z) represents an electrophilic carbon site on second compound R.

In the case of the first compound being one that has two anionic carbon sites bonded to each other, the reaction proceeds as follows, where (Y) is an anionic carbon site, (Z) is an electrophilic carbon site, and n is the number of monomeric units in the polymer:

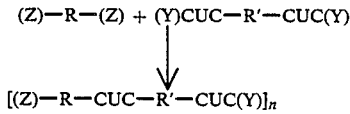

The polymer products can be precipitated from the reaction solution simply by acidifying, preferably with a large excess, e.g. 100% excess, of an aqueous mineral acid such as hydrochloric acid. The polymer products can be purified or separated from the reaction mixture by filtration or centrifugation, by conventional solvent extraction procedures and selective solution procedures if desired.

The following specific examples are intended to illustrate the nature of the invention without acting as a limitation upon its scope.

EXAMPLE 1

Indenyl sodium was prepared as follows.

Freshly cut sodium chunks (1.75 g, 76 mmol) in ca. 100 mL tetrahydrofuran (THF) were treated with freshly-distilled indene (5.0 g, 43 mmol) at room temperature. A yellow color developed in the solution almost immediately. The mixture was stirred at room temperature and $H_2$ gas was seen to evolve. After the gas evolution slowed, a heating mantle was added and the mixture was warmed to reflux. The mixture was cooled after most of the sodium had dissolved and transferred via cannula to a Schlenk flask. Its concentration was determined by titration to be 0.18M (10 mL was added to water and titrated with 1.8 mL of 1N HCl).

Polymerization of indenyl sodium with pyromellitic dianhydride (PMDA) was carried out as follows.

1,2,4,5-Benzene tetracarboxylic anhydride (pyromellitic dianhydride or PMDA) was sublimed to purify it. Two grams (9.16 mmol) of sublimed PMDA in 100 mL THF was cooled in an ice bath and triethyl amine (3 mL) was added. Indenyl sodium (51 mL of solution in THF, 0.18M, 9.2 mmol) was added dropwise via a pressure-equalizing addition funnel. An immediate reaction occurred with the formation of a deep orange-black solution. After overnight stirring the solution was a deep orange. It was quenched with aqueous 1N HCl and stirred until the polymer agglomerated. The solvent was decanted and the residual polymer was dissolved in acetone, dried over anhydrous sodium sulfate, filtered and the solvents removed by rotary evaporation. A deep orange, polymeric material was obtained that was soluble in acetone, THF and alcohols. High-quality films could be cast from THF and fibers could be pulled from concentrated solution. Treatment of the polymer with aqueous NaOH resulted in the formation of deep green solutions which cast to form deep-green polymeric films.

EXAMPLE 2

Cyclopentadienyl sodium (CpNa) was prepared from cyclopentadiene by a procedure analogous to that used for the preparation of indenyl sodium in Example 1. In a typical reaction between cyclopentadienyl sodium and pyromellitic anhyride to prepare a polymer, sublimed pyromellitic dianhydride (PMDA) (7.73 g, 21.7 mmol) dissolved in 100 mL THF was treated with triethylamine (6 mL, 44 mmol) and cooled to 0° C. Cyclopentadienyl sodium (CpNa, 0.59M in THF, 38 mL, 22 mmol) was added dropwise over 0.5 hour. After overnight stirring and warming to ambient temperature, the dark brown solution was added to aqueous 1N HCl and stirred until the polymer agglomerated. The aqueous solution was then decanted, the polymer was dissolved in THF and dried over sodium sulfate. The THF was removed by rotary evaporation. The polymer was ground to a fine powder, washed with liberal quantities of water and dried in vacuo. This procedure yielded 5.7 g (92%) of dark brown material.

EXAMPLE 3

Cyclopentadienyl sodium was reacted with 3,3', 4,4'-benzophenone tetracarboxylic dianhydride (BTDA) as follows. The BTDA (7.00 g, 21.7 mmol) was dissolved in 250 mL THF. Triethylamine (4 mL, 40 mmol) was added, the solution was cooled in an ice bath, and cyclopentadienyl sodium in THF solution (2.0M, 11 mL) was added dropwise via a pressure equalizing addition funnel. During the addition the solution darkened significantly until it was black-orange. The ice bath was removed and the solution was warmed to room temperature. A very dark orange solution was obtained. This was quenched by adding it to ice containing 1N HCl. Diethyl ether was added, which caused the polymer to precipitate and stick inside a separatory funnel. The polymer was redissolved in THF, dried over anhydrous sodium sulfate and the solvent removed by rotary evaporation. The orange-brown polymer (7.8 g) had excellent film-forming properties and very long fibers could be pulled from concentrated THF solution. The polymer was soluble in THF, acetone, alcohols and ethyl acetate, as well as in aqueous 1M sodium hydroxide base.

EXAMPLE 4

Preparation of dilithium-1,3-diethynyl benzene. A three necked round-bottomed flask equipped with a gas inlet, pressure equalizing addition funnel, magnetic stirrer and rubber stopper was charged with 1,3-diethynyl benzene (2.97 g, 23.6 mmol) dissolved in approximately 100 mL THF. This solution was cooled to 0° C. and methyllithium (1.56M in diethyl ether, 30.2 mL) was added dropwise. Methane evolved with each drop and an orange solid appeared and agglomerated. The mixture was subjected to vacuum to remove ether and more THF was added to help dissolve the desired product. After overnight stirring the solution resembling pink lemonade was decanted via cannula to a Schlenk storage flask. The concentration was determined by adding 4 mL of this solution to distilled water and titrating with 0.1N HCl. The concentration was determined to be 0.0375M.

Pyromellitic dianhydride (PMDA, 1.00 g, 4.59 mmol) was dissolved in 50 mL THF and cooled to 0° C. Dilithium 1,3-diethynylbenzene solution (0.0375M, 122 mL, 1 eg.) prepared as described above, was added dropwise via cannula. The solution turned amber colored during the addition. It was then allowed to warm to room temperture. After overnight stirring it was quenched with HCl in ice, extracted with ether, dried over anhydrous sodium sulfate, filtered, and the solvent removed. The polymer was insoluble in organic solvents, but dissolved in aqueous 1M sodium hydroxide base.

EXAMPLE 5

Preparation of dilithium 1,9-Decadiyne, 1,9-Decadiyne (2.91 g, 21.7 mmol) in 100 mL THF was cooled to 0° C. and methyllithium (1.56M in THF solution, 27.8 mL) was added dropwise. Methane gas evolved and a white precipitate formed after about one-half of the methyllithium had been added. After the addition was complete the mixture was allowed to warm to room temperature.

Pyromellitic dianhydride (4.7 g, 21.7 mmol) was dissolved in 30 mL THF and added dropwise to the foregoing mixture at 0° C. A beige colored precipitate formed during the addition. After overnight stirring at room temperature the mixture was quenched with aqueous 1N HCl. A rubbery orange solid was obtained that was sparingly soluble in acetone and THF but dissolved completely in aqueous 1M sodium hydroxide.

EXAMPLE 6

Polymerization Reaction Between Dimethyl Carbonate and Cyclopentadienyl Sodium, Triethyl amine (3.1 mL, 22.4 mmol) and dimethyl carbonate (1.6 mL, 19 mmol) in ca. 50 mL THF were cooled to 0° C. and CpNa (1.64 g in 100 mL THF) was added dropwise via cannula over 20 min. The solution was allowed to warm to room temperature, during which time it turned dark orange. After three hours at room temperature it was warmed slightly with a water bath and it turned darker. It was quenched with aqueous 1N HCl. The product polymer was partially soluble in THF and aqueous 1M sodium hydroxide.

EXAMPLE 7

Polymerization Reaction Between Adipoyl Chloride and CpNa. Adipoyl Chloride (1 mL, 6.74 mmol) was dissolved in approximately 50 mL THF and treated with CpNa dissolved in THF (1.77M, 3.8 mL) containing approximately 10 mL additional THF and 5 mL triethyl amine. During the addition the solution turned orange. After overnight stirring at room temperature the dark solution was quenched with 1N HCl in ice and stirred until the polymer separated. It was redissolved in THF, dried over sodium sulfate and filtered. The solvent was removed from the filtrate by rotary evaporation. This yielded a brown polymer that appeared to be thermoplastic. Films of polymer were cast from a THF solution of the polymer.

EXAMPLE 8

Reaction of Toluene 2,4-Diisocyanate (TDI) with CpNa. Toluene diisocyanate (80% 2,4 remainder 2,6-) (1.0 mL, 7.0 mmol) was dissolved in 25 mL THF and cooled to 0° C. CpNa solution in THF (1.77M, 4 mL) containing triethyl amine (5 mL) was added dropwise to the first solution. An orange color developed immediately and a thick precipitate formed. Additional THF was added to facilitate stirring. A peach colored suspension was obtained. After stirring 1 hour the mixture was added to 1N HCl in ice and acidified with HCl to pH 5. The volatile solvents were removed by rotary evaporation and the suspended solid was then isolated by suction filtration. It was then washed several times with water and then acetone and dried under high vacuum. This yielded 1.8 g of a polymer that was insoluble in THF, water, acetone, hot DMF and chloroform. It decomposed at 350°–490° C. without melting.

EXAMPLE 9

Polymerization Reaction Between Phenyl Phosphonic Dichloride and CpNa. Phenyl phosphonic dichloride (2.23 g, 11.4 mmol) in ca. 100 mL THF was cooled in an ice bath and CpNa in THF solution (0.59M, 19 mL) containing triethyl amine (3.1 mL, 22 mmol) was added dropwise. A light-yellow color developed immediately at the beginning of the addition. Upon completion the mixture was muddy brown and contained suspended solid. After overnight stirring the mixture was darker. It was quenched by pouring it over ice containing a little HCl. After stirring to evaporate the THF the mixture was filtered to obtain a light-grey polymer that was soluble in chloroform and DMSO. The polymer is easily compressed to form shiny pellets and casts films from DMSO that exhibit a metallic sheen.

EXAMPLE 10

Treatment of 4,4'-oxy bis benzoyl chloride with Cyclopentadienyl Sodium. 4,4'-oxy bis benzoyl chloride (1.00 g, 3.39 mmol) was dissolved in 50 mL of THF. Triethylamine (1 mL, 10 mmol) was added, the solution was cooled in an ice bath, and cyclopentadienyl sodium in THF solution (2.0M, 1.7 mL) was added dropwise via a pressure equalizing funnel. The ice bath was removed and the solution warmed to room temperature. After stirring 20 hours the mixture was poured over ice containing 1N HCl. The mixture was stirred until the ice melted and the polymer was isolated by suction filtration. The polymer was redissolved in THF, dried over anhydrous sodium sulfate and the solvent removed by rotary evaporation.

EXAMPLE 11

Treatment of 1,1'-Ferrocene Dicarboxylic Acid Dichloride with Cyclopentadienyl Sodium. The dielectrophile 1,1'-ferrocene dicarboxylic acid dichloride (1.0 g, 3.22 mmol) was dissolved in 50 mL of THF. Triethylamine (1 mL, 10 mmol) was added, the solution was cooled in an ice bath, and cyclopentadienyl sodium in THF solution (2.9M, 1.6 mL) was added dropwise via a pressure equalizing addition funnel. After warming to room temperature as the ice melted and stirring at room temperature for 20 hours, the mixture was poured over ice containing 1 N HCl. The mixture was stirred until the polymer agglomerated. The orange-brown polymer was isolated by solution filtration.

What is claimed is:

1. An organic condensation polymer in which the bonds connecting the monomeric units are carbon-carbon bonds.

2. An organic condensation polymer made by reacting in solution a first compound having at least two anionic carbon sites bonded to each other either directly or through a chain of 1 to 30 carbon atoms, with a second compound having at least two electrophilic carbon sites bonded to each other either directly or through a chain of 1 to 30 carbon atoms.

3. An organic condensation polymer made by reacting in solution a first compound having an anionic carbon site and a latent anionic carbon site bonded to each other either directly or through a chain of 1 to 30 carbon atoms, with a second compound having at least two electrophilic carbon sites bonded to each other either directly or through a chain of 1 to 30 carbon atoms, said reaction being carried out under deprotonating conditions.

4. A polymer as claimed in claim 2 or 3 in which each said anionic carbon site of said first compound is ionically associated with a metal of Group I, II or III of the Periodic Table or with ammonium or phosphonium 5. A polymer as claimed in claim 4 in which each said anionic site of said first compound is ionically associated with an alkali metal, an alkaline earth metal, ammonium, or phosphonium.

6. A polymer as claimed in claim 3 in which said first compound includes a non-aromatic unsaturated hydrocarbon ring having an anionic carbon site, ionically associated with an alkali metal, an alkaline earth metal, ammonium or phosphonium and said second compound includes a carbonyl group or an isocyanate group which forms each electrophilic site.

7. A polymer as claimed in claim 6 having a backbone chain consisting of carbon atoms and in which said first compound comprises cyclopentadienyl-alkali metal, -alkaline earth metal, -ammonium or -phosphonium, and said second compound comprises at least two carbonyl groups bonded to each other either directly or through a chain of 1 to 30 carbon atoms.

8. A polymer as claimed in claim 6 having a backbone chain consisting of carbon atoms and in which said first compound comprises cyclopentadienyl-alkali metal, -alkaline earth metal, -ammonium or -phosphonium, and said second compound comprises at least two isocyanate groups bonded to each other either directly or through a chain of 1 to 30 carbon atoms.

9. A polymer as claimed in claim 6 having a backbone chain consisting of carbon atoms and in which said first compound comprises indenyl-alkali metal, -alkaline earth metal, -ammonium, or -phosphonium, and said second compound comprises at least two carbonyl groups bonded to each other either directly or through a chain of 1 to 30 carbon atoms.

10. A polymer as claimed in claim 6 having a backbone chain consisting of carbon atoms and in which said first compound comprises indenyl-alkali metal, -alkaline earth metal, -ammonium, or -phosphonium, and said second compound comprises at least two isocyanate groups bonded to each other either directly or through a chain of 1 to 30 carbon atoms.

11. A polymer as claimed in claim 2 in which said first compound comprises at least two acetylenyl groups bonded to each other directly or through a chain of 1 to 30 carbon atoms, and each said acetylenyl group is ionically associated with a metal of Group I, II, or III of the Periodic Table or with ammonium or phosphonium.

12. A polymer as claimed in claim 11 in which each said acetylenyl group is ionically associated with an alkali metal, an alkaline earth metal, ammonium, or phosphonium.

13. A polymer as claimed in claim 11 or 12 in which said first compound comprises a diethynyl benzene and said second compound comprises at least two carbonyl groups bonded to each other either directly or through a chain of 1 to 30 carbon atoms.

14. A polymer as claimed in claim 11 or 12 in which said first compound comprises a diethynyl benzene and said second compound comprises at least two isocyanate groups bonded to each other either directly or through a chain of 1 to 30 carbon atoms.

15. A polymer as claimed in claim 11 or 12 in which said first compound comprises a diethynyl alkane in which said alkane has 1 to 30 carbon atoms in the chain between said ethynyl groups and said second compound comprises at least two carbonyl groups bonded to each other either directly or through a chain of 1 to 30 carbon atoms.

16. A polymer as claimed in claim 11 or 12 in which said first compound comprises a diethynyl alkane in which said alkane has 1 to 30 carbon atoms in the chain between said ethynyl groups and said second compound comprises at least two isocyanate groups bonded to each other either directly or through a chain of 1 to 30 carbon atoms.

17. A polymer as claimed in claim 13 in which said first compound comprises 1,3-diethynyl benzene.

18. A polymer as claimed in claim 13 in which said first compound comprises 1,9-decadiyne.

19. A polymer as claimed in claim 2 or 11 in which said second compound comprises a carbonic acid diester or dihalide.

20. A polymer as claimed in claim 2 or 11 in which said second compound comprises a diester, dihalide, diamide, or dianhydride of a polycarboxylic acid or a diisocyanate 21. Method of making an organic condensation polymer which comprises reacting in solution at a temperature from −78° to 200° C. a first compound providing at least two anionic carbon sites bonded to each other either directly or through a chain of 1 to 30 carbon atoms, with a second compound having at least two electrophilic carbon sites bonded to each other either directly or through a chain of 1 to 30 carbon atoms.

22. Method of making an organic condensation polymer which comprises reacting in solution at a temperature from −78° to 200° C. a first compound having an anionic carbon site and a latent anionic carbon site bonded to each other either directly or through a chain of 1 to 30 carbon atoms, with a second compound having at least two electrophilic carbon sites bonded to each other either directly or through a chain of 1 to 30 carbon atoms, said reaction being carried out under deprotonating conditions.

23. Method of making an organic polymer as claimed in claim 22 in which said first compound includes a non-aromatic unsaturated hydrocarbon ring ionically associated with an alkali metal, alkaline earth metal, ammonium, or phosphonium, and said second compound includes a carbonyl group which forms each electrophilic site, said compounds being present in approximately equivalent amounts and said reaction solution containing a deprotonating agent in an amount at least equivalent to the amount of said first compound, and after said reaction adding an excess of mineral acid to said solution.

24. Method as claimed in claim 23 in which said deprotonating agent is an alkyl amine.

25. Method of making an organic polymer as claimed in claim 21 in which said first compound comprises at least two acetylenyl groups bonded to each other directly or through a chain of 1 to 30 carbon atoms, and each said acetylenyl group is ionically associated with an alkali metal, alkaline earth metal, ammonium or phosphonium, and said second compound includes a carbonyl group which forms each electrophilic site, then adding an excess of mineral acid to said solution.

26. Method of making an organic polymer as claimed in claim 21 in which said first compound comprises two acetylenyl groups bonded to each other directly or through a chain of 1 to 30 carbon atoms, and each said acetylenyl group is ionically associated with an alkali metal, alkaline earth metal, ammonium or phosphonium and said second compound comprises at least two isocyanate groups bonded to each other either directly or through a chain of 1 to 30 carbon atoms, and including the step of adding to said solution after said reaction an excess of aqueous mineral acid.

27. Method as claimed in claim 23 or 25 in which said second compound comprises a carbonic acid diester or dihalide.

28. Method as claimed in claim 23 or 25 in which said second compound comprises a diester, dihalide, diamide, or dianhydride of a polycarboxylic acid, or a diisocyanate.

* * * * *